(12) United States Patent
Aoki et al.

(10) Patent No.: US 8,523,343 B2
(45) Date of Patent: Sep. 3, 2013

(54) AQUEOUS INK COMPOSITION, INK JET RECORDING METHOD, AND RECORDED MATTER

(75) Inventors: Katsuko Aoki, Kiso-machi (JP); Hiroshi Mukai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 47 days.

(21) Appl. No.: 13/016,401

(22) Filed: Jan. 28, 2011

(65) Prior Publication Data

US 2011/0183125 A1   Jul. 28, 2011

(30) Foreign Application Priority Data

Jan. 28, 2010   (JP) .................................. 2010-016691

(51) Int. Cl.
*C09D 11/00*   (2006.01)
(52) U.S. Cl.
USPC ........................................................ 347/100
(58) Field of Classification Search
USPC ........................................................ 347/100
See application file for complete search history.

(56) References Cited

U.S. PATENT DOCUMENTS

| | | | |
|---|---|---|---|
| 3,582,487 A | 6/1971 | Fuhr et al. |
| 3,607,693 A | 9/1971 | Heine et al. |
| 3,720,635 A | 3/1973 | Metzner et al. |
| 3,929,693 A | 12/1975 | Hochberg |
| 4,007,144 A | 2/1977 | Sanders et al. |
| 4,129,486 A | 12/1978 | Deutsch et al. |
| 4,133,793 A | 1/1979 | Lewis et al. |
| 4,190,602 A | 2/1980 | Brunisholz et al. |
| 4,233,195 A | 11/1980 | Mills |
| 4,239,866 A | 12/1980 | Reitel et al. |
| 4,239,966 A | 12/1980 | Wang |
| 4,308,400 A | 12/1981 | Felder et al. |
| 4,315,807 A | 2/1982 | Felder et al. |
| 4,318,791 A | 3/1982 | Felder et al. |
| 4,320,186 A | 3/1982 | Kato et al. |
| 4,321,118 A | 3/1982 | Felder et al. |
| 4,347,111 A | 8/1982 | Gehlhaus et al. |
| 4,370,379 A | 1/1983 | Kato et al. |
| 4,450,279 A | 5/1984 | Shirosaki et al. |
| 4,477,681 A | 10/1984 | Gehlhaus et al. |
| 4,507,466 A | 3/1985 | Tomalia et al. |
| 4,522,693 A | 6/1985 | Henne et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 4,721,734 A | 1/1988 | Gehlhaus et al. |
| 4,830,902 A | 5/1989 | Plantenga et al. |
| 4,922,004 A | 5/1990 | Kohler et al. |
| 5,041,516 A | 8/1991 | Frechet et al. |
| 5,077,402 A | 12/1991 | Desobry et al. |
| 5,212,212 A | 5/1993 | Fonda |
| 5,221,334 A | 6/1993 | Ma et al. |
| 5,281,682 A | 1/1994 | Cornforth et al. |
| 5,453,121 A | 9/1995 | Nicholls et al. |
| 5,609,671 A | 3/1997 | Nagasawa |
| 5,623,001 A | 4/1997 | Figov |
| 5,662,736 A | 9/1997 | Sakai et al. |
| 5,662,738 A | 9/1997 | Schmid et al. |
| 5,690,723 A | 11/1997 | Sano et al. |
| 5,846,306 A | 12/1998 | Kubota et al. |
| 5,903,290 A | 5/1999 | Nicoloff, Jr. et al. |
| 5,928,419 A | 7/1999 | Uemura et al. |
| 5,952,401 A | 9/1999 | Kimura et al. |
| 5,958,121 A | 9/1999 | Lin |
| 5,976,233 A | 11/1999 | Osumi et al. |
| 6,030,441 A | 2/2000 | Kubota et al. |
| 6,087,416 A | 7/2000 | Pearlstine et al. |
| 6,114,404 A | 9/2000 | Deeken et al. |
| 6,117,606 A | 9/2000 | Macholdt et al. |
| 6,123,759 A | 9/2000 | Mise et al. |
| 6,136,286 A | 10/2000 | Okuyama et al. |
| 6,179,415 B1 | 1/2001 | Okazaki et al. |
| 6,187,897 B1 | 2/2001 | Kawashima et al. |

(Continued)

FOREIGN PATENT DOCUMENTS

| CN | 1086637 C | 6/2002 |
|---|---|---|
| CN | 1398724 A | 2/2003 |

(Continued)

OTHER PUBLICATIONS

European Search Report of related European Application No. 11152226 dated May 11, 2011.
[No Author Listed] Ciba DAROCUR EDB, Photoinitiator. Ciba Specialty Chemicals, Inc., Coating Effects. Feb. 20, 2003. 2 pages.
[No Author Listed] Ciba IRGACURE 369. Photoinitiator. Ciba Specialty Chemicals, Inc., Coating Effects Segment. Sep. 4, 2001. 3 pages.
[No Author Listed] Ciba IRGACURE 819. Photoinitiator. Ciba Specialty Chemicals Inc., Coating Effects Segment. Aug. 30, 2001, 3 pages.
[No Author Listed] Ciba IRGASTAB UV 22. Next gerneration in-can stabilizer for outstanding stabilization performance of UV inks and coatings. Ciba Specialty Chemicals Inc. 2006, 2 pages.
[No Author Listed] Dispersion. Definition. Hawley's Condensed Chemical Dictionary [Online]. 2007, 1 page Retrieved Oct. 22, 2010.
[No Author Listed] Dispersion (chemistry). Definition. Wikipedia. Last Modified Oct. 22, 2010. 2 pages. Retrieved Oct. 25, 2010 from <http://en.wikipedia.org/w/index.php?title=Dispersion_(chemistry)&printable=yes>.

(Continued)

*Primary Examiner* — Laura Martin
(74) *Attorney, Agent, or Firm* — Nutter McClennon & Fish LLP; John J. Penny, Jr.; Lydia G. Olson

(57) ABSTRACT

An ink jet recording method includes ejecting droplets of an aqueous ink composition from an ink jet recording apparatus onto a non-ink-absorbing or low-ink-absorbing recording medium, and heating the recording medium to 40° C. or more to dry the aqueous ink composition deposited on the recording medium, wherein the first solvent content (W1) is 3% by mass or more and 6% by mass or less of the mass of the aqueous ink composition, the ratio (W2/W1) of the second solvent content (W2) to the first solvent content (W1) is one or more, and the ratio [(W2+W3)/(W1)] of the total (W2+W3) of the second solvent content (W2) and the third solvent content (W3) to the first solvent content (W1) is three or more.

8 Claims, No Drawings

(56) References Cited

U.S. PATENT DOCUMENTS

| | | |
|---|---|---|
| 6,300,388 B1 | 10/2001 | Verdonck et al. |
| 6,322,188 B1 | 11/2001 | Sano |
| 6,331,111 B1 | 12/2001 | Cao |
| 6,332,291 B1 | 12/2001 | Flosbach et al. |
| 6,341,841 B1 | 1/2002 | Shimada et al. |
| 6,395,079 B1 | 5/2002 | Sano |
| 6,419,733 B1 | 7/2002 | Sano et al. |
| 6,428,662 B1 | 8/2002 | Woodruff et al. |
| 6,433,038 B1 | 8/2002 | Tanabe et al. |
| 6,444,019 B1 | 9/2002 | Zou et al. |
| 6,488,751 B1 | 12/2002 | Takemoto |
| 6,491,748 B2 | 12/2002 | Watanabe |
| 6,518,370 B2 | 2/2003 | Abuelyaman et al. |
| 6,558,460 B1 | 5/2003 | Walker et al. |
| 6,558,753 B1 | 5/2003 | Ylitalo et al. |
| 6,602,333 B2 | 8/2003 | Miyabayashi |
| 6,637,850 B2 | 10/2003 | Shimada et al. |
| 6,653,367 B2 | 11/2003 | Miyabayashi |
| 6,654,367 B1 | 11/2003 | Kaufman |
| 6,664,306 B2 | 12/2003 | Gaddam et al. |
| 6,726,756 B1 | 4/2004 | Zou et al. |
| 6,793,313 B1 | 9/2004 | Adachi et al. |
| 6,793,318 B2 | 9/2004 | Saksa |
| 6,846,074 B2 | 1/2005 | Hirai |
| 6,846,851 B2 | 1/2005 | Nakhmanovich et al. |
| 6,849,110 B2 | 2/2005 | Sano |
| 6,869,470 B2 | 3/2005 | Kato |
| 6,877,851 B2 | 4/2005 | Watanabe |
| 6,890,049 B2 | 5/2005 | Shimada et al. |
| 6,924,327 B2 | 8/2005 | Sano et al. |
| 6,989,054 B2 | 1/2006 | Tanabe et al. |
| 7,008,475 B2 | 3/2006 | Randler et al. |
| 7,025,449 B2 | 4/2006 | Simons et al. |
| 7,040,747 B2 | 5/2006 | Kubota et al. |
| 7,064,153 B2 | 6/2006 | Bruck |
| 7,156,909 B2 | 1/2007 | Oyanagi et al. |
| 7,259,100 B2 | 8/2007 | Zurcher et al. |
| 7,285,592 B2 | 10/2007 | Harz et al. |
| 7,296,883 B2 | 11/2007 | Kanaya et al. |
| 7,303,619 B2 | 12/2007 | Oyanagi |
| 7,348,128 B2 | 3/2008 | Yamada et al. |
| 7,384,472 B2 | 6/2008 | Schweikart et al. |
| 7,419,255 B2 | 9/2008 | Kawaguchi et al. |
| 7,438,405 B2 | 10/2008 | Ichizawa et al. |
| 7,513,945 B2 | 4/2009 | Nakano et al. |
| 7,538,144 B2 | 5/2009 | Vanmaele et al. |
| 7,581,829 B2 | 9/2009 | Oyanagi et al. |
| 7,591,889 B2 | 9/2009 | Stoffel et al. |
| 7,604,693 B2 | 10/2009 | Oyanagi et al. |
| 7,619,015 B2 | 11/2009 | Oyanagi et al. |
| 7,670,418 B2 | 3/2010 | Kato et al. |
| 7,732,505 B2 | 6/2010 | Kito et al. |
| 7,753,514 B2 | 7/2010 | Nakano et al. |
| 7,790,245 B2 | 9/2010 | Oyanagi et al. |
| 7,828,888 B2 | 11/2010 | Itano et al. |
| 7,846,246 B2 | 12/2010 | Oyanagi et al. |
| 7,850,280 B2 | 12/2010 | Oyanagi et al. |
| 7,854,798 B2 | 12/2010 | Udagawa et al. |
| 7,855,041 B2 | 12/2010 | Weber et al. |
| 7,866,807 B2 | 1/2011 | Makuta et al. |
| 7,968,621 B2 | 6/2011 | Oyanagi et al. |
| 8,044,116 B2 | 10/2011 | Idemura et al. |
| 8,227,539 B2 | 7/2012 | Oyanagi et al. |
| 2003/0003296 A1 | 1/2003 | Dries et al. |
| 2003/0017353 A1 | 1/2003 | Yamaguchi et al. |
| 2003/0050379 A1 | 3/2003 | Shih et al. |
| 2003/0089271 A1 | 5/2003 | Hirano et al. |
| 2003/0144377 A1 | 7/2003 | Sano et al. |
| 2003/0153649 A1 | 8/2003 | Bromberg |
| 2003/0157356 A1 | 8/2003 | Tamura et al. |
| 2003/0176566 A1 | 9/2003 | Wight et al. |
| 2003/0222959 A1 | 12/2003 | Yamanouchi et al. |
| 2003/0231234 A1 | 12/2003 | Ushirogouchi et al. |
| 2004/0021753 A1 | 2/2004 | Yoshihiro et al. |
| 2004/0069183 A1 | 4/2004 | Kamoto et al. |
| 2004/0257419 A1 | 12/2004 | Iinuma et al. |
| 2004/0266907 A1 | 12/2004 | Sugita et al. |
| 2005/0039631 A1 | 2/2005 | Best et al. |
| 2005/0158524 A1 | 7/2005 | Sloat et al. |
| 2005/0159501 A1 | 7/2005 | Kiefer-Liptak |
| 2005/0176841 A1 | 8/2005 | Krohn |
| 2005/0176847 A1 | 8/2005 | Cagle |
| 2005/0197418 A1 | 9/2005 | Graziano et al. |
| 2005/0197419 A1 | 9/2005 | Graziano et al. |
| 2005/0282930 A1 | 12/2005 | Fu et al. |
| 2006/0009546 A1 | 1/2006 | Brown |
| 2006/0014849 A1 | 1/2006 | Vanmaele et al. |
| 2006/0014850 A1 | 1/2006 | Vanmaele et al. |
| 2006/0036001 A1 | 2/2006 | Oyanagi et al. |
| 2006/0092254 A1 | 5/2006 | Claes et al. |
| 2006/0158493 A1 | 7/2006 | Nakano et al. |
| 2006/0160917 A1 | 7/2006 | Oyanagi et al. |
| 2006/0187285 A1 | 8/2006 | Oyanagi et al. |
| 2006/0189712 A1 | 8/2006 | Kondo |
| 2006/0211788 A1 | 9/2006 | Krohn |
| 2006/0229382 A1 | 10/2006 | Schweikart et al. |
| 2006/0268084 A1 | 11/2006 | Nishizaki et al. |
| 2007/0022547 A1 | 2/2007 | O'Brien |
| 2007/0037961 A1 | 2/2007 | Oyanagi et al. |
| 2007/0044684 A1 | 3/2007 | Nakano et al. |
| 2007/0046720 A1 | 3/2007 | Konno et al. |
| 2007/0060670 A1 | 3/2007 | Ellis |
| 2007/0076069 A1 | 4/2007 | Edwards et al. |
| 2007/0120926 A1 | 5/2007 | Doumaux et al. |
| 2007/0129457 A1 | 6/2007 | Nakano et al. |
| 2007/0142501 A1 | 6/2007 | Oyanagi et al. |
| 2007/0148585 A1 | 6/2007 | Kaneko et al. |
| 2007/0222811 A1* | 9/2007 | Yanagi .......................... 347/21 |
| 2007/0224345 A1 | 9/2007 | Metz et al. |
| 2007/0249750 A1 | 10/2007 | Oyanagi et al. |
| 2007/0281141 A1 | 12/2007 | Kohlweyer |
| 2008/0022893 A1 | 1/2008 | Mizutani |
| 2008/0024577 A1 | 1/2008 | Nakano et al. |
| 2008/0028980 A1 | 2/2008 | Aoki et al. |
| 2008/0081119 A1 | 4/2008 | Oyanagi et al. |
| 2008/0090931 A1 | 4/2008 | Nagvekar et al. |
| 2008/0096998 A1 | 4/2008 | Oyanagi et al. |
| 2008/0098928 A1 | 5/2008 | Oyanagi et al. |
| 2008/0125511 A1 | 5/2008 | Nakano et al. |
| 2008/0132599 A1 | 6/2008 | Nakano et al. |
| 2008/0145628 A1 | 6/2008 | Oyanagi et al. |
| 2008/0146689 A1 | 6/2008 | Oyanagi et al. |
| 2008/0152825 A1 | 6/2008 | Mukai et al. |
| 2008/0152828 A1 | 6/2008 | Mukai et al. |
| 2008/0152877 A1 | 6/2008 | Mukai et al. |
| 2008/0173214 A1 | 7/2008 | Oyanagi et al. |
| 2008/0182083 A1* | 7/2008 | Oyanagi et al. ............ 428/195.1 |
| 2008/0182085 A1 | 7/2008 | Oyanagi et al. |
| 2008/0207805 A1 | 8/2008 | Blease et al. |
| 2008/0213518 A1 | 9/2008 | Oyanagi et al. |
| 2008/0233362 A1 | 9/2008 | Kato et al. |
| 2008/0250970 A1 | 10/2008 | Oyanagi et al. |
| 2008/0308004 A1 | 12/2008 | Deroover et al. |
| 2009/0053415 A1 | 2/2009 | Isobe |
| 2009/0075036 A1 | 3/2009 | Itano et al. |
| 2009/0099277 A1 | 4/2009 | Nagvekar et al. |
| 2009/0110827 A1 | 4/2009 | Nakano et al. |
| 2009/0142555 A1 | 6/2009 | Sano et al. |
| 2009/0169834 A1 | 7/2009 | Sano et al. |
| 2009/0208651 A1 | 8/2009 | Oyanagi et al. |
| 2009/0214833 A1 | 8/2009 | Oyanagi et al. |
| 2009/0220695 A1 | 9/2009 | Oyanagi et al. |
| 2009/0233064 A1 | 9/2009 | Yatake et al. |
| 2009/0246479 A1 | 10/2009 | Mukai et al. |
| 2009/0280265 A1 | 11/2009 | Oyanagi et al. |
| 2009/0289973 A1 | 11/2009 | Makuta et al. |
| 2009/0295847 A1 | 12/2009 | Mukai et al. |
| 2010/0009136 A1 | 1/2010 | Oyanagi et al. |
| 2010/0086690 A1 | 4/2010 | Aoki |
| 2010/0086691 A1* | 4/2010 | Mukai et al. ................. 427/256 |
| 2010/0092674 A1 | 4/2010 | Mukai et al. |
| 2010/0092675 A1 | 4/2010 | Aoki |
| 2011/0014440 A1 | 1/2011 | Itano et al. |
| 2011/0036266 A1 | 2/2011 | Oyanagi et al. |

| | | | |
|---|---|---|---|
| 2011/0183124 A1 | 7/2011 | Aoki et al. | |
| 2011/0287236 A1 | 11/2011 | Nakano et al. | |
| 2012/0006224 A1 | 1/2012 | Oyanagi et al. | |

FOREIGN PATENT DOCUMENTS

| | | | |
|---|---|---|---|
| CN | 1529740 A | 9/2004 | |
| CN | 1721462 A | 1/2006 | |
| CN | 1771307 A | 5/2006 | |
| DE | 10 200 502 1160 A1 | 11/2006 | |
| EP | 0 040 721 A2 | 12/1981 | |
| EP | 0 042 567 A2 | 12/1981 | |
| EP | 0 192 167 A1 | 8/1986 | |
| EP | 0 284 561 A2 | 9/1988 | |
| EP | 0 333 224 A2 | 9/1989 | |
| EP | 0 352 821 A1 | 1/1990 | |
| EP | 0 372 778 A1 | 6/1990 | |
| EP | 0 400 721 A2 | 12/1990 | |
| EP | 0894835 A2 | 3/1999 | |
| EP | 0 997 507 A1 | 5/2000 | |
| EP | 1 045 013 A1 | 10/2000 | |
| EP | 1 260 563 A1 | 11/2002 | |
| EP | 1295916 A1 | 3/2003 | |
| EP | 1 422 072 A1 | 5/2004 | |
| EP | 1 452 569 A1 | 9/2004 | |
| EP | 1 614 730 A1 | 1/2006 | |
| EP | 1 616 920 A1 | 1/2006 | |
| EP | 1 616 921 A1 | 1/2006 | |
| EP | 1 674 499 A1 | 6/2006 | |
| EP | 1 752 504 A1 | 2/2007 | |
| EP | 1 806 387 A1 | 7/2007 | |
| EP | 1 815 978 A1 | 8/2007 | |
| EP | 1 837 381 A1 | 9/2007 | |
| EP | 1 862 511 A1 | 12/2007 | |
| EP | 1 892 105 A1 | 2/2008 | |
| EP | 1 942 157 A2 | 7/2008 | |
| EP | 1 942 158 A2 | 7/2008 | |
| EP | 1 947 151 A1 | 7/2008 | |
| EP | 1 950 260 A1 | 7/2008 | |
| GB | 1 276 369 A | 6/1972 | |
| GB | 1 547 283 A | 6/1979 | |
| GB | 2 029 433 A | 3/1980 | |
| GB | 2 172 655 A | 9/1986 | |
| GB | 2 367 299 A | 4/2002 | |
| JP | 47-003981 B | 2/1972 | |
| JP | 47-006416 B | 2/1972 | |
| JP | 47-022326 B | 6/1972 | |
| JP | 47-023664 B | 7/1972 | |
| JP | 56-28256 A | 3/1981 | |
| JP | 57-030704 A | 2/1982 | |
| JP | 59-042864 B2 | 10/1984 | |
| JP | 60-026403 B | 6/1985 | |
| JP | 60-026483 B | 6/1985 | |
| JP | 61-194062 A | 8/1986 | |
| JP | 62-001426 A | 1/1987 | |
| JP | 62-081345 A | 4/1987 | |
| JP | 63-061950 B2 | 11/1988 | |
| JP | 01-034242 B2 | 7/1989 | |
| JP | 01-238656 A | 9/1989 | |
| JP | 02-009596 B2 | 3/1990 | |
| JP | 02-009597 B2 | 3/1990 | |
| JP | 02-211452 A | 8/1990 | |
| JP | 356573 A | 3/1991 | |
| JP | 3-79678 A | 4/1991 | |
| JP | 03160068 A | 7/1991 | |
| JP | 03-216379 A | 9/1991 | |
| JP | 4-18462 A | 1/1992 | |
| JP | 05-186725 A | 7/1993 | |
| JP | 62-01426 A | 7/1994 | |
| JP | 07-258578 A | 10/1995 | |
| JP | 08-003498 A | 1/1996 | |
| JP | 08-218018 A | 8/1996 | |
| JP | 08-283596 A | 10/1996 | |
| JP | 08-295836 A | 11/1996 | |
| JP | 10-110110 A | 4/1998 | |
| JP | 10-110111 A | 4/1998 | |
| JP | 10-110114 A | 4/1998 | |
| JP | 10-120956 A | 5/1998 | |
| JP | 10-120958 A | 5/1998 | |
| JP | 10-195331 A | 7/1998 | |
| JP | 10-195360 A | 7/1998 | |
| JP | 10-237349 A | 9/1998 | |
| JP | 10-287035 A | 10/1998 | |
| JP | 10-330665 A | 12/1998 | |
| JP | 11-011002 A | 1/1999 | |
| JP | 11-165420 A | 6/1999 | |
| JP | 11-193316 A | 7/1999 | |
| JP | 11-202558 A | 7/1999 | |
| JP | 11-343436 A | 12/1999 | |
| JP | 2000-044858 A | 2/2000 | |
| JP | 2000-044861 A | 2/2000 | |
| JP | 2000-336295 A | 12/2000 | |
| JP | 2000-345080 A | 12/2000 | |
| JP | 2000-355667 A | 12/2000 | |
| JP | 2001-348519 A | 12/2001 | |
| JP | 2002-038063 A | 2/2002 | |
| JP | 2002-179960 A | 6/2002 | |
| JP | 2002-225414 A | 8/2002 | |
| JP | 2002-249165 A | 9/2002 | |
| JP | 2002-256189 A | 9/2002 | |
| JP | 2002-529572 A | 9/2002 | |
| JP | 2002-292775 A | 10/2002 | |
| JP | 2002-332436 A | 11/2002 | |
| JP | 2002-348513 A | 12/2002 | |
| JP | 2003-012971 A | 1/2003 | |
| JP | 2003-055463 A | 2/2003 | |
| JP | 2003-055563 A | 2/2003 | |
| JP | 2003-096337 A | 4/2003 | |
| JP | 2003-147233 A | 5/2003 | |
| JP | 2003-253148 A | 9/2003 | |
| JP | 2003-292836 A | 10/2003 | |
| JP | 2003-292857 A | 10/2003 | |
| JP | 2003-306625 A | 10/2003 | |
| JP | 2003-311945 A | 11/2003 | |
| JP | 2003-342499 A | 12/2003 | |
| JP | 2004-009359 A | 1/2004 | |
| JP | 2004-009360 A | 1/2004 | |
| JP | 2004-018716 A | 1/2004 | |
| JP | 2004-059857 A | 2/2004 | |
| JP | 2004-066817 A | 3/2004 | |
| JP | 2004-099796 A | 4/2004 | |
| JP | 2004-161852 A | 6/2004 | |
| JP | 2004-174971 A | 6/2004 | |
| JP | 2004-195797 A | 7/2004 | |
| JP | 2004-197055 A | 7/2004 | |
| JP | 2004-216654 A | 8/2004 | |
| JP | 2004-250659 A | 9/2004 | |
| JP | 2004-263139 A | 9/2004 | |
| JP | 2004-264435 A | 9/2004 | |
| JP | 2004-535506 A | 11/2004 | |
| JP | 2004-535508 A | 11/2004 | |
| JP | 2004-359960 A | 12/2004 | |
| JP | 2005-007577 A | 1/2005 | |
| JP | 2005-008690 A | 1/2005 | |
| JP | 2005-015813 A | 1/2005 | |
| JP | 2005-023284 A | 1/2005 | |
| JP | 2005-023299 A | 1/2005 | |
| JP | 2005-036079 A | 2/2005 | |
| JP | 2005-60411 A | 3/2005 | |
| JP | 2005-60419 A | 3/2005 | |
| JP | 2005-068250 A | 3/2005 | |
| JP | 2005-068251 A | 3/2005 | |
| JP | 2005-068252 A | 3/2005 | |
| JP | 2005-068439 A | 3/2005 | |
| JP | 2005-096254 A | 4/2005 | |
| JP | 2005-161583 A | 6/2005 | |
| JP | 2005-187659 A | 7/2005 | |
| JP | 2005-220352 A | 8/2005 | |
| JP | 2005-290362 A | 10/2005 | |
| JP | 2005-298757 A | 10/2005 | |
| JP | 2005-314655 A | 11/2005 | |
| JP | 2005-350551 A | 12/2005 | |
| JP | 2005-536375 A | 12/2005 | |
| JP | 2006-070255 A | 3/2006 | |
| JP | 2006-117795 A | 5/2006 | |
| JP | 2006-117931 A | 5/2006 | |
| JP | 2006-123529 A | 5/2006 | |
| JP | 2006-123542 A | 5/2006 | |
| JP | 2006-137183 A | 6/2006 | |

| | | | |
|---|---|---|---|
| JP | 2006-176734 A | 7/2006 | |
| JP | 2006-199929 A | 8/2006 | |
| JP | 2006-206875 A | 8/2006 | |
| JP | 2006-241194 A | 9/2006 | |
| JP | 2006-257302 A | 9/2006 | |
| JP | 2006-257303 A | 9/2006 | |
| JP | 2006-265292 A | 10/2006 | |
| JP | 2006-265524 A | 10/2006 | |
| JP | 2006-274025 A | 10/2006 | |
| JP | 2006-274029 A | 10/2006 | |
| JP | 2006-281538 A | 10/2006 | |
| JP | 2006-281568 A | 10/2006 | |
| JP | 2006-281570 A | 10/2006 | |
| JP | 2006-282822 A | 10/2006 | |
| JP | 2006-282823 A | 10/2006 | |
| JP | 2006-283017 A | 10/2006 | |
| JP | 2006-523762 A | 10/2006 | |
| JP | 2006-312711 A | 11/2006 | |
| JP | 2007-016103 A | 1/2007 | |
| JP | 2007-023161 A | 2/2007 | |
| JP | 2007-045989 A | 2/2007 | |
| JP | 2007-045990 A | 2/2007 | |
| JP | 2007-046034 A | 2/2007 | |
| JP | 2007-055084 A | 3/2007 | |
| JP | 2007-100053 A | 4/2007 | |
| JP | 2007-100054 A | 4/2007 | |
| JP | 2007-112970 A | 5/2007 | |
| JP | 2007-131741 A | 5/2007 | |
| JP | 2007-138084 A | 6/2007 | |
| JP | 2007-154087 A | 6/2007 | |
| JP | 2007-169306 A | 7/2007 | |
| JP | 2007-169307 A | 7/2007 | |
| JP | 2007-169308 A | 7/2007 | |
| JP | 2007-169451 A | 7/2007 | |
| JP | 2007-182535 A | 7/2007 | |
| JP | 2007-182536 A | 7/2007 | |
| JP | 2007-191613 A | 8/2007 | |
| JP | 2007-211036 A | 8/2007 | |
| JP | 2007-254735 A | 10/2007 | |
| JP | 2007-262272 A | 10/2007 | |
| JP | 2007-269017 A | 10/2007 | |
| JP | 2007-270085 A | 10/2007 | |
| JP | 2007-297586 A | 11/2007 | |
| JP | 2008-075067 A | 4/2008 | |
| JP | 2008-138045 A | 6/2008 | |
| JP | 2008-155523 A | 7/2008 | |
| JP | 2008-155524 A | 7/2008 | |
| JP | 2008-174712 A | 7/2008 | |
| JP | 2009-113494 A | 5/2009 | |
| JP | 2009-114454 A | 5/2009 | |
| JP | 2009-242441 A | 10/2009 | |
| JP | 2010-6062 A | 1/2010 | |
| JP | 2010-90270 A | 4/2010 | |
| JP | 2010-90271 A | 4/2010 | |
| JP | 2010-94809 A | 4/2010 | |
| JP | 2010-94852 A | 4/2010 | |
| JP | 2006-272933 A | 10/2010 | |
| WO | 93/21235 A1 | 10/1993 | |
| WO | 99/05230 A1 | 2/1999 | |
| WO | 00/52530 A1 | 9/2000 | |
| WO | 01/08895 A1 | 2/2001 | |
| WO | 02/38687 A1 | 5/2002 | |
| WO | 02/055619 A1 | 7/2002 | |
| WO | 02/076764 A2 | 10/2002 | |
| WO | 2004/018197 A1 | 3/2004 | |
| WO | 2004/031308 A1 | 4/2004 | |
| WO | 2004/052947 A1 | 6/2004 | |
| WO | 2004/094534 A1 | 11/2004 | |
| WO | 2004/104051 A1 | 12/2004 | |
| WO | 2005/047405 A1 | 5/2005 | |
| WO | 2005/061566 A1 | 7/2005 | |
| WO | 2005/089957 A1 | 9/2005 | |
| WO | 2005/095006 A1 | 10/2005 | |
| WO | 2006/041004 A1 | 4/2006 | |
| WO | 2006/085992 A2 | 8/2006 | |
| WO | 2006/087930 A1 | 8/2006 | |
| WO | 2006/098676 A1 | 9/2006 | |
| WO | 2006/101054 A1 | 9/2006 | |
| WO | 2006/112031 A1 | 10/2006 | |
| WO | 2007/026355 A2 | 3/2007 | |
| WO | 2007/026366 A1 | 3/2007 | |
| WO | 2007/060264 A2 | 5/2007 | |

OTHER PUBLICATIONS

[No Author Listed] IRGACURE 127. Photoinitiator. Ciba Specialty Chemicals Inc., Coating Effects Segment. Apr. 9, 2004, 4 pages.

[No Author Listed] Laromer UA 9029 V. Technical Information. BASF Aktiengesellschaft. EVP 009403 e, Rev. 0, Dec. 2003. 4 pages.

[No Author Listed] Organic Materials for Imaging, The Japanese Research Association for Organic Electronics Materials. Bunshin Publishing Co., p. 187-192 (1993).

[No Author Listed] BYK-UV 3500 BYK-UV 3510 BYK-UV 3530 BYK-UV-3570. Surface Additives for Radiation Curable Systems. BYK Additives & Instruments. Issue Jul. 2008. BYK-Chemie GmbH, Germany. 4 pages.

Chatterjee et al., "Photochemistry of Carbocyanine Alkyltriphenylborate Salts: Intra-Ion Pair Electron Transfer and the Chemistry of Boranyl Radicals", Journal of American Chemistry Society, vol. 112, p. 6329-6338 (1990).

Chinese Office Action issued Nov. 30, 2010 for Application No. 200910004654.0 (11 Pages).

Davidson, R.S., "The Chemistry of Photoinitiators—some recent developments", Journal of Photochemistry and Photobiology A: Chemistry, vol. 73, p. 81-96 (1993).

Eaton, D.F., "One-electron Oxidation of Benzyltrialkylstannanes. 1. Cation Radical Fragmentation by Dual Modes", Journal of American Chemistry Society, vol. 102, p. 3278-3281 (1980).

Extended European Search Report issued Apr. 21, 2008 for Application No. 07024545.1 (5 Pages).

Extended European Search Report issued Dec. 29, 2008 in connection with European Application No. 08016440.3 (5 Pages).

Extended European Search Report issued Nov. 2, 2011 for Application No. 11177753.8 (6 Pages).

Fouassier, J.P., et al., "Radiation Curing in Polymer Science and Technology. vol. 1: Fundamentals and Methods," Elsevier Applied Science, vol. 1, p. 77-117 (1993).

"Fouassier, J.P., ""Photoinitiated Polymerisation—Theory and Applications"" Rapra Review Reports, vol. 9, No. 4, p. 1-23 (1998)."

"Hawker et al., ""Preparation of Polymers with Controlled Molecular Architecture. A New Convergent Approach to Dendritic Macromolecules"", Journal of American Chemistry Society, vol. 112, p. 7638-7647 (1990)."

"Hawker et al., ""Hyperbranched Poly(ethylene glycol)s: A New Class of Ion-Conducting Materials"", Macromolecules, vol. 29, p. 3831-3838 (1996)."

International Search Report mailed Sep. 16, 2008 from Related International Application No. PCT/JP2008/064126. (2 pages).

Japanese Office Action issued Sep. 27, 2011 for Application No. 2006-201363.

Japanese Office Action issued May 25, 2011 for Application No. 2007-304874 (8 Pages).

Japanese Office Action issued Mar. 9, 2011 for Application No. 2007-316368 (9 Pages).

"Kim, Y.H., ""Highly Branched Aromatic Polymers Prepared by Single Step Syntheses"", Macromolecular Symposia, vol. 77, p. 21-33 (1994)."

Maslak, P, "Fragmentations by Photoinduced Electron Transfer. Fundamentals and Practical Aspects", Topics in Current Chemistry, vol. 168, p. 1-46 (1993).

Monroe et al., "Photoinitiators for Free-Radical-Initiated Photoimaging Systems", Chemical Reviews, vol. 93, p. 435-448 (1993).

Saeva, F.D., "Photoinduced Electron Transfer (PET) Bond Cleavage Reactions", Topics in Current Chemistry, vol. 156, p. 59-62 (1990).

Shirai et al., "Photoacid and Photobase Generators: Chemistry and Applications to Polymeric Materials", Prog. Polym. ScL, vol. 21, p. 1-45 (1996).

Step et al., Mechanism of polymer stabilization by hindered-amine light stabilizaers (HALS). Model investigations of the interaction of peroxy radicals with HALS amines and amino ethers. Marcomolecules. 1994;27:2529-2539.

U.S. Office Action issued Dec. 21, 2011 for U.S. Appl. No. 12/074,308 (16 Pages).

U.S. Office Action issued Jun. 8, 2012 for U.S. Appl. No. 12/074,308 (25 Pages).

U.S. Non-final Office Action for U.S. Appl. No. 12/228,193, mailed Jun. 2, 2011.

U.S. Office Action for U.S. Appl. No. 12/228,193, mailed Oct. 14, 2011 (7 Pages).

U.S. Office Action for U.S. Appl. No. 12/228,193, mailed Mar. 8, 2012 (8 Pages).

U.S. Office Action for U.S. Appl. No. 12/228,224, issued Jun. 2, 2011 (13 Pages).

Notice of Allowance for U.S. Appl. No. 12/228,224, issued Oct. 20, 2011 (8 Pages).

U.S. Supplemental Notice of Allowance issued Jun. 28, 2012 for U.S. Appl. No. 12/228,224 (2 Pages).

U.S. Office Action issued Apr. 26, 2012 for U.S. Appl. No. 12/394,336 (13 Pages).

U.S. Office Action for U.S. Appl. No. 12/894,423 issued Nov. 10, 2011. (10 Pages).

U.S. Office Action issued May 29, 2012 for U.S. Appl. No. 12/894,423 (9 Pages).

U.S. Office Action issued Jan. 6, 2012 for U.S. Appl. No. 13/197,174 (8 Pages).

U.S. Office Action issued Dec. 12, 2011 for U.S. Appl. No. 13/240,667 (14 Pages).

\* cited by examiner

AQUEOUS INK COMPOSITION, INK JET RECORDING METHOD, AND RECORDED MATTER

BACKGROUND

1. Technical Field

The present invention relates to an aqueous ink composition, an ink jet recording method, and recorded matter produced by the ink jet recording method using the aqueous ink composition.

2. Related Art

Non-aqueous ink compositions containing organic solvent are quick to dry and cause little bleeding or blurring and have therefore been used in recording on nonabsorbing media, such as plastics, that do not absorb ink. From the standpoints of global environment protection and safety, however, aqueous ink compositions containing water as solvent are becoming widespread.

Some aqueous ink compositions containing a yellow pigment as a coloring material contain C.I. pigment yellow 74 as the yellow pigment. However, C.I. pigment yellow 74 has insufficient light resistance. Thus, C.I. pigment yellow 180 is being studied to improve light resistance.

However, aqueous ink compositions containing C.I. pigment yellow 180 may have low storage stability at low temperature. More specifically, thawing of aqueous ink compositions containing C.I. pigment yellow 180 in a frozen state stored at a low temperature of −10° C. or less can cause the agglomeration of the pigment. For example, in JP-A-2005-60411, JP-A-2005-60419, and JP-A-2007-154087, a moisturizing component, such as glycerin, is added to aqueous ink compositions containing a yellow pigment to prevent the freezing of the aqueous ink compositions. The addition of a moisturizing component, such as glycerin, to aqueous ink compositions containing a yellow pigment sometimes improves low-temperature storage stability.

The formation of images on recording media, such as plastics, using aqueous ink compositions containing a yellow pigment may cause blurring of the images by contact with another color pigment, thereby producing low-quality images. In order to avoid this problem, it is known that an alkanediol is added to an aqueous ink composition to reduce blurring of images.

For example, JP-A-2007-154087 discloses that the addition of 1,2-hexanediol to an aqueous ink composition can produce high-quality images without chrominance non-uniformity in some recorded images.

However, the addition of a moisturizing component, such as glycerin, to aqueous ink compositions containing C.I. pigment yellow 180 has sometimes reduced the abrasion resistance of images formed on recording media, such as plastics, thereby producing low-quality images.

Furthermore, the addition of an alkanediol to aqueous ink compositions containing C.I. pigment yellow 180 has sometimes reduced the low-temperature storage stability of the aqueous ink compositions.

SUMMARY

An advantage of some aspects of the invention is that it provides an ink jet recording method that can ensure low-temperature storage stability of an aqueous ink composition, produce high ejection stability, reduce blurring of images formed on a particular recording medium, and produce images having high abrasion resistance.

The invention has been achieved to solve at least part of the problems described above and can be implemented in accordance with the following aspects or applications.

Application 1

An ink jet recording method according to an aspect of the invention is an ink jet recording method including ejecting droplets of an aqueous ink composition from an ink jet recording apparatus onto a non-ink-absorbing or low-ink-absorbing recording medium, and heating the recording medium to 40° C. or more to dry the aqueous ink composition deposited on the recording medium, wherein the aqueous ink composition contains a pigment containing C.I. pigment yellow 180, a first solvent containing at least one selected from 1,2-hexanediol and 1,2-pentanediol, a second solvent containing at least one selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric triamide, and a third solvent containing at least one selected from propylene glycol and 1,3-propanediol, the first solvent content (W1) is 3% by mass or more and 6% by mass or less of the mass of the aqueous ink composition, the ratio (W2/W1) of the second solvent content (W2) to the first solvent content (W1) is one or more, and the ratio [(W2+W3)/(W1)] of the total (W2+W3) of the second solvent content (W2) and the third solvent content (W3) to the first solvent content (W1) is three or more.

The ink jet recording method according to Application 1 can ensure low-temperature storage stability of an aqueous ink composition, produce high ejection stability, reduce blurring of images formed on a non-ink-absorbing or low-ink-absorbing recording medium, and produce images having high abrasion resistance. The term "low temperature", as used herein, refers to a temperature of −10° C. or less at which an aqueous ink composition freezes.

Application 2

In Application 1, the total (W2+W3) of the second solvent content (W2) and the third solvent content (W3) may be 9% by mass or more and 25% by mass or less of the aqueous ink composition.

Application 3

In Application 1 or 2, the pigment content may be 1% by mass or more and 10% by mass or less of the aqueous ink composition.

Application 4

In any one of Applications 1 to 3, the aqueous ink composition may have a viscosity of 2 mPa·s or more and 10 mPa·s or less at a measurement temperature of 20° C.

Application 5

Recorded matter according to an aspect of the invention is prepared by an ink jet recording method according to any one of Applications 1 to 4.

Application 6

An aqueous ink composition according to an aspect of the invention is an aqueous ink composition for use in an ink jet recording method, the aqueous ink composition including a pigment containing C.I. pigment yellow 180, a first solvent containing at least one selected from 1,2-hexanediol and 1,2-pentanediol, a second solvent containing at least one selected from the group consisting of 2-pyrrolidone, N-methyl-2-pyrrolidone, N,N'-dimethylpropyleneurea, 1,3-dimethyl-2- imidazolidinone, tetramethylurea, dimethyl sulfoxide, and hexamethylphosphoric triamide, and a third solvent containing at least one selected from propylene glycol and 1,3-propanediol, wherein the first solvent content (W1) is 3% by mass or more and 6% by mass or less of the mass of the aqueous ink composition, the ratio (W2/W1) of the second solvent content (W2) to the first solvent content (W1) is one or more, and the ratio [(W2+W3)/(W1)] of the total (W2+W3) of the second solvent content (W2) and the third solvent content (W3) to the first solvent content (W1) is three or more.

The aqueous ink composition according to Application 6 can ensure low-temperature storage stability of an aqueous ink composition, produce high ejection stability, reduce blurring of images formed on a non-ink-absorbing or low-ink-absorbing recording medium, and produce images having high abrasion resistance.

Application 7

In Application 6, the ink jet recording method may include ejecting droplets of the aqueous ink composition from an ink jet recording apparatus onto a non-ink-absorbing or low-ink-absorbing recording medium, and heating the recording medium to 40° C. or more to dry the aqueous ink composition deposited on the recording medium.

DESCRIPTION OF EXEMPLARY EMBODIMENTS

Preferred embodiments of the invention will be described in detail below. These embodiments are offered by way of illustration only. The invention is not limited to these embodiments and includes various modifications thereof without departing from the gist of the invention.

1. Ink Jet Recording Method

An ink jet recording method according to an embodiment of the invention includes ejecting droplets of an aqueous ink composition from an ink jet recording apparatus onto a non-ink-absorbing or low-ink-absorbing recording medium, and heating the recording medium to 40° C. or more to dry the aqueous ink composition deposited on the recording medium, wherein the aqueous ink composition contains a pigment containing C.I. pigment yellow 180, a first solvent containing at least one selected from 1,2-hexanediol and 1,2-pentanediol, a second solvent containing at least one selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric triamide, and a third solvent containing at least one selected from propylene glycol and 1,3-propanediol, the first solvent content (W1) is 3% by mass or more and 6% by mass or less of the mass of the aqueous ink composition, the ratio (W2/W1) of the second solvent content (W2) to the first solvent content (W1) is one or more, and the ratio [(W2+W3)/(W1)] of the total (W2+W3) of the second solvent content (W2) and the third solvent content (W3) to the first solvent content (W1) is three or more. The term "image", as used herein, refers to a printed pattern formed of dots and includes text printing and solid printing.

1.1. Ink Jet Recording Process

An ink jet recording method according to an embodiment of the invention includes ejecting droplets of an aqueous ink composition from an ink jet recording apparatus onto a non-ink-absorbing or low-ink-absorbing recording medium, and heating the recording medium to 40° C. or more to dry the aqueous ink composition deposited on the recording medium.

The ink jet recording apparatus may be any ink jet recording apparatus that can eject ink droplets onto a recording medium for recording and preferably has a function of heating the recording medium during printing. The term "during printing", as used herein, refers to a period from the time at which ink droplets ejected from an ink jet recording apparatus adhere to a recording medium to the time at which the ink is dried.

The function of heating a recording medium may be a print heater function in which a recording medium is directly heated with a heat source in contact with the recording medium or a dryer function in which the recording medium is irradiated with infrared rays or a microwave (an electromagnetic wave having the maximum wavelength at approximately 2,450 MHz) or is blown by a warm current of air without contact between the recording medium and the heat source. The print heater function and the dryer function may be utilized alone or in combination. Such a heating function can control drying temperature during printing.

A recording medium on which ink droplets ejected from an ink jet recording apparatus are deposited may be dried with a dryer or in a thermostat oven or bath at a predetermined temperature.

A recording medium is a non-ink-absorbing or low-ink-absorbing recording medium (hereinafter also referred to simply as a "plastic medium"). Examples of the non-ink-absorbing recording medium include plastic films that are not surface-treated for ink jet printing (that is, plastic films having no ink-absorbing layer) and substrates, such as paper sheets, to which a plastic is applied or on which a plastic film is laminated. The plastics include poly(vinyl chloride), poly(ethylene terephthalate), polycarbonate, polystyrene, polyurethane, polyethylene, and polypropylene. Examples of the low-ink-absorbing recording medium include actual printing paper, such as art paper, coated paper, and matte paper.

The phrase "non-ink-absorbing or low-ink-absorbing recording medium", as used herein, refers to a recording medium that absorbs 10 mL/m2 or less of water for a contact time of 30 msec/1/2 as determined by a Bristow method. The Bristow method is the most widely used method for measuring the amount of liquid absorbed for a short period of time. The Bristow method has been adopted by Japan Technical Association of the Pulp and Paper Industry (JAPAN TAPPI). The details of the Bristow method is described in specification No. 51 "Kami Oyobi Itagami—Ekitai Kyushusei Siken Houhou—Buristo Hou (Paper and paperboard—liquid absorption test method—Bristow method)" in "JAPAN TAPPI Test Methods", 2000.

An ink jet recording method using an ink jet recording apparatus can be performed as described below. An aqueous ink composition (described below) is ejected as droplets onto a plastic medium to form an image on the plastic medium. An ink jet ejection method may be any conventionally known method. In particular, a method for ejecting droplets utilizing the vibration of a piezoelectric element (a recording method using an ink jet head that can form ink droplets by the mechanical deformation of an electrostrictive element) enables excellent image recording.

The plastic medium is then heated to 40° C. or more with a print heater of the ink jet recording apparatus and a dryer to dry the aqueous ink composition (described below) deposited on the plastic medium. This step rapidly evaporates water in the aqueous ink composition deposited on the plastic medium, and resin particles (described below) in the aqueous ink composition form a film. This produces high-quality images even on the plastic medium in a short period of time with reduced occurrence of inconsistencies in density and bleeding or blurring. The formation of the film formed of the resin particles allows dried ink to adhere to the plastic medium, thus fixing the images.

The heating temperature of the plastic medium is 40° C. or more, preferably 40° C. or more and 80° C. or less, more preferably 40° C. or more and 60° C. or less. Heating the plastic medium to 40° C. or more can effectively promote the evaporation of a liquid medium in the aqueous ink composition. The heating temperature of the plastic medium higher than 80° C. may cause defects, such as deformation, in some plastic media or defects, such as contraction, in some plastic media cooled to room temperature.

The heating time of the plastic medium is not particularly limited provided that a liquid medium in the aqueous ink composition can evaporate and a resin fixative can form a film. The heating time is appropriately determined in consideration of the types of solvent and resin particles and the printing speed employed.

1.2. Aqueous Ink Composition

An aqueous ink composition for use in an ink jet recording method according to an embodiment of the invention will be described in detail below.

1.2.1. Pigment

An aqueous ink composition for use in an ink jet recording method according to the present embodiment contains C.I. pigment yellow 180 as a pigment. C.I. pigment yellow 180 has high light resistance and, in combination with a first solvent described below, can form high-quality images.

In general, thawing of aqueous ink compositions containing C.I. pigment yellow 180 in a frozen state stored at low temperature tends to cause the agglomeration of the pigment. However, thawing of an aqueous ink composition according to the present embodiment having a composition described below stored at low temperature causes less agglomeration of C.I. pigment yellow 180. Thus, the aqueous ink composition has excellent low-temperature storage stability.

The C.I. pigment yellow 180 content is preferably 1% by mass or more and 10% by mass or less, more preferably 3% by mass or more and 7% by mass or less, of the total mass of the aqueous ink composition. The C.I. pigment yellow 180 content within the range described above results in excellent dispersibility of C.I. pigment yellow 180 in the aqueous ink composition and excellent color reproduction of images formed on plastic media.

1.2.2. Solvent

An aqueous ink composition for use in an ink jet recording method according to the present embodiment contains a first solvent, a second solvent, and a third solvent.

The first solvent contains at least one selected from 1,2-hexanediol and 1,2-pentanediol. The first solvent improves the wettability of the aqueous ink composition on plastic media and can reduce ink bleeding in images formed on the plastic media.

The first solvent content (W1) is 3% by mass or more and 6% by mass or less of the total mass of the aqueous ink composition. The first solvent content (W1) within the range described above results in high-quality images with less ink bleeding. The first solvent content (W1) below the lower limit may cause ink bleeding, resulting in low-quality images. The first solvent content (W1) above the upper limit may cause the agglomeration of pigment in the aqueous ink composition at low temperature, resulting in low storage stability.

The second solvent contains at least one selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric triamide.

The third solvent contains at least one selected from propylene glycol and 1,3-propanediol.

The second solvent and the third solvent have excellent compatibility with the first solvent and can improve the low-temperature storage stability of the aqueous ink composition. The second solvent and the third solvent can reduce an increase in the viscosity of the aqueous ink composition and the agglomeration of pigment after the thawing of the aqueous ink composition in a frozen state. Thus, the aqueous ink composition after thawing can be used with high ejection stability.

The second solvent content (W2) is preferably 3% by mass or more, more preferably 3% by mass or more and 24% by mass or less, of the total mass of the aqueous ink composition. The third solvent content (W3) is preferably 22% by mass or less, more preferably 1% by mass or more and 22% by mass or less, of the total mass of the aqueous ink composition. Preferably, the total (W2+W3) of the second solvent content (W2) and the third solvent content (W3) is 9% by mass or more and 25% by mass or less.

The second solvent content (W2) of 3% by mass or more and the total content (W2+W3) of the second solvent and the third solvent of 9% by mass or more result in the aqueous ink composition having excellent low-temperature storage stability. In contrast, the second solvent content (W2) below 3% by mass and the total content (W2+W3) of the second solvent and the third solvent below 9% by mass may result in poor low-temperature storage stability of the aqueous ink composition. The second solvent content (W2) above 24% by mass may result in poor drying characteristics of images formed on plastic media. The third solvent content (W3) above 22% by mass may result in poor drying characteristics or low abrasion resistance of images formed on plastic media. The total (W2+W3) of the second solvent content (W2) and the third solvent content (W3) above 25% by mass may result in poor drying characteristics or low abrasion resistance of images.

In an aqueous ink composition for use in an ink jet recording method according to the present embodiment, the ratio (W2/W1) of the second solvent content (W2) to the first solvent content (W1) is one or more, preferably one or more and eight or less, and the ratio [(W2+W3)/(W1)] of the total (W2+W3) of the second solvent content (W2) and the third solvent content (W3) to the first solvent content (W1) is three or more, preferably three or more and eight or less. The ratios (W2/W1) and [(W2+W3)/(W1)] within the ranges described above result in excellent low-temperature storage stability, high ejection stability, and high-quality images formed on plastic media with less blurring.

The (W2/W1) of one or more and the [(W2+W3)/(W1)] of three or more result in excellent low-temperature storage stability of the aqueous ink composition. However, the (W2/W1) below one or the [(W2+W3)/(W1)] below three may result in low ejection stability of the aqueous ink composition or poor low-temperature storage stability due to an increase in viscosity or the agglomeration of pigment. The (W2/W1) above eight or the [(W2+W3)/(W1)] above eight may result in poor drying characteristics and blurring of images, although the aqueous ink composition has good low-temperature storage stability.

Preferably, an aqueous ink composition for use in an ink jet recording method according to the present embodiment does not contain glycerin. Glycerin can impart moisture retainability to aqueous ink compositions or improve the low-temperature storage stability of aqueous ink compositions. This can reduce nozzle clogging in ink jet recording apparatuses and improve the ejection stability of ink. However, the addition of glycerin may result in poor drying characteristics of images formed on plastic media and low abrasion resistance of images after drying.

Preferably, an aqueous ink composition for use in an ink jet recording method according to the present embodiment does not contain glycol ethers. Glycol ethers can improve the wettability of aqueous ink compositions on plastic media and can reduce ink bleeding in images formed on the plastic media. However, glycol ethers may lower the storage stability or the ejection stability of aqueous ink compositions.

Examples of the glycol ethers include ethylene glycol monobutyl ether, ethylene glycol mono-t-butyl ether, ethylene glycol mono-iso-propyl ether, 1-methyl-1-methoxybutanol, diethylene glycol monobutyl ether, diethylene glycol mono-t-butyl ether, diethylene glycol monopropyl ether, diethylene glycol mono-iso-propyl ether, triethylene glycol monobutyl ether, propylene glycol monopropyl ether, propylene glycol mono-iso-propyl ether, propylene glycol monobutyl ether, propylene glycol mono-t-butyl ether, dipropylene glycol monopropyl ether, dipropylene glycol mono-iso-propyl ether, and dipropylene glycol monobutyl ether.

Without the addition of glycerin or glycol ethers, when the ratios and the amounts of the first solvent, the second solvent, and the third solvent are within the ranges described above, an aqueous ink composition for use in an ink jet recording method according to the present embodiment has high ejection stability and low-temperature storage stability, can reduce blurring of images formed on plastic media, and can produce images having high abrasion resistance.

1.2.3. Water

An aqueous ink composition for use in an ink jet recording method according to the present embodiment contains water. Water is the main medium of the aqueous ink composition and evaporates in the drying process described above.

Preferably, the water contains only a minimal amount of ionic impurities and may be pure water or ultrapure water, such as ion-exchanged water, ultrafiltered water, reverse osmosis water, or distilled water. Use of water sterilized, for example, by ultraviolet irradiation or the addition of hydrogen peroxide can prevent the generation of mold or bacteria in pigment dispersions or aqueous ink compositions containing the pigment dispersions during long-term storage.

1.2.4. Other Components

An aqueous ink composition for use in an ink jet recording method according to the present embodiment can further contain resin particles, a resin dispersant, a silicon surfactant, a pH-adjusting agent, a preservative or fungicide, an anticorrosive, and a chelator.

Resin particles can solidify images formed on plastic media and firmly fix the images on the plastic media. Preferably, an aqueous ink composition for use in an ink jet recording method according to the present embodiment contains resin particles in emulsion or suspension. Resin particles in emulsion or suspension can facilitate control of the viscosity of the aqueous ink composition within an appropriate range for an ink jet recording method according to the present embodiment, thus ensuring the storage stability and the ejection stability of the aqueous ink composition.

A resin dispersant can stably disperse the pigment described above (C.I. pigment yellow 180) in the aqueous ink composition.

Examples of the components of the resin particles and the resin dispersant include homopolymers and copolymers of acrylic acid, acrylate, methacrylic acid, methacrylate, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, and vinylidene chloride, fluorocarbon resin, and natural resin. The copolymers may be random copolymers, block copolymers, alternating copolymers, or graft copolymers.

The resin particles may be manufactured by a known method using known materials. For example, resin particles described in JP-B-62-1426, JP-A-3-56573, JP-A-3-79678, JP-A-3-160068, and JP-A-4-18462 may be used. The resin particles may be a commercial product, for example, Microgel E-1002 or E-5002 (trade names, manufactured by Nippon Paint Co., Ltd.), Voncoat 4001 or 5454 (trade names, manufactured by Dainippon Ink and Chemicals, Inc.), SAE1014 (trade name, manufactured by ZEON Co.), Saibinol SK-200 (trade name, manufactured by Saiden Chemical Industry Co., Ltd.), or Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade names, manufactured by BASF Japan Ltd.).

The resin dispersant may be a commercial product, for example, Joncryl 67, 678, 586, 611, 680, 682, 683, or 690 (trade names, manufactured by BASF Japan Ltd.).

A silicon surfactant can uniformly spread ink on plastic media to prevent inconsistencies in density and bleeding of ink. The silicon surfactant content preferably ranges from 0.1% by mass to 1.5% by mass of the total mass of the aqueous ink composition. The silicon surfactant content below 0.1% by mass may result in insufficient wettability of ink on plastic media, often causing inconsistencies in density or bleeding of ink. The silicon surfactant content above 1.5% by mass may result in low storage stability and ejection stability of the aqueous ink composition.

The silicon surfactant is preferably a polysiloxane compound, for example, polyether-modified organosiloxane. The silicon surfactant may be a commercial product, for example, BYK-306, BYK-307, BYK-333, BYK-341, BYK-345, BYK-346, or BYK-348 (trade names, manufactured by BYK Japan KK), or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade names, manufactured by Shin-Etsu Chemical Co., Ltd.).

Examples of the pH-adjusting agent include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Examples of the preservative and fungicide include sodium benzoate, sodium pentachlorophenol, sodium 2-pyridinethiol-1-oxide, sodium sorbate, sodium dehydroacetate, and 1,2-dibenzisothiazolin-3-one. The preservative and fungicide may be a commercial product, such as Proxel XL2 or GXL (trade names, manufactured by Avecia Ltd.) or Denicide CSA or NS-500W (trade names, manufactured by Nagase ChemteX Co.).

Examples of the anticorrosive include benzotriazole.

Examples of the chelator include ethylenediaminetetraacetic acid and salts thereof (disodium dihydrogen ethylenediaminetetraacetate).

1.2.5. Physical Properties

The viscosity of an aqueous ink composition for use in an ink jet recording method according to the present embodiment at 20° C. is preferably 2 mPa·s or more and 10 mPa·s or less, more preferably 3 mPa·s or more and 6 mPa·s or less. The viscosity of the aqueous ink composition at 20° C. within the range described above allows a proper number of droplets of the aqueous ink composition to be ejected from a nozzle, further reducing the flight deviation and scattering of droplets. Thus, the aqueous ink composition can be suitably used in ink jet recording apparatuses. The viscosity of an aqueous ink composition can be measured with an oscillation viscometer VM-100AL (manufactured by Yamaichi Electronics Co., Ltd.) while the temperature of the aqueous ink composition is maintained at 20° C.

2. Recorded Matter

Recorded matter according to an embodiment of the invention is prepared by an ink jet recording method described above. Images recorded on plastic media using an aqueous ink composition described above are of good quality with less ink bleeding and high abrasion resistance.

3. Examples

Although the invention is further described in the following examples, the invention is not limited to these examples.
3.1. Preparation of Pigment Dispersion
A pigment dispersion containing pigment dispersed with a resin dispersant was used in an aqueous ink composition used in the present example.

The pigment dispersion was prepared as described below. First, 100 parts by mass of a mixture containing 5.0 parts by mass of an acrylic acid-acrylate copolymer as a resin dispersant, 20 parts by mass of C.I. pigment yellow 180 as pigment, and ion-exchanged water was prepared. The mixture, together with zirconia beads (having a diameter of 1.5 mm), was dispersed in a sand mill (manufactured by Yasukawa Seisakusho Co., Ltd.) for six hours. The zirconia beads were separated with a separator to prepare the pigment dispersion.

In Example 3, the pigment dispersion was prepared in the same manner except that 4.5 parts by mass of the acrylic acid-acrylate copolymer and 17.5 parts by mass of C.I. pigment yellow 180 were used.

In Comparative Example 1, the pigment dispersion was prepared in the same manner except that C.I. pigment yellow 74 was used in place of C.I. pigment yellow 180 as pigment.
3.2. Preparation of Aqueous Ink Composition
A first solvent, a third solvent, a second solvent, a silicon surfactant, and ion-exchanged water were added to the pigment dispersion in accordance with the compositions described in Tables 1 and 2. The solution was then mixed at normal temperature for one hour and was filtered through a membrane filter having a pore size of 5 μm to prepare an aqueous ink composition.

In Comparative Example 6, the aqueous ink composition was prepared in the same manner except that the third solvent was not added but glycerin was added.

In Comparative Example 7, the aqueous ink composition was prepared in the same manner except that the third solvent was not added but ethylene glycol monobutyl ether was added.

The components in the tables were as follows:
(1) Pigment
  C.I. pigment yellow 180
  C.I. pigment yellow 74
(2) First Solvent
  1,2-hexanediol
  1,2-pentanediol
(3) Second Solvent
  1,3-dimethyl-2-imidazolidinone
  N,N'-dimethylpropyleneurea
  2-pyrrolidone
  N-methyl-2-pyrrolidone
(4) Third Solvent
  Propylene glycol
  1,3-propanediol
(5) Other Solvents
  Glycerin
  Diethylene glycol monobutyl ether
(6) Silicon Surfactant
  Silicon surfactant (manufactured by BYK Japan KK, trade name "BYK-348", polyether-modified siloxane)
(7) Resin Dispersant
  Acrylic acid-acrylate copolymer
(8) Resin Particles
  Styrene-acrylic acid copolymer
3.3. Evaluation Test
3.3.1. Evaluation of Storage Stability
An aqueous ink composition hermetically sealed in a sample bottle was stored at −20° C. for three days and then at 20° C. for four hours. The storage stability was evaluated by comparing the viscosity of the aqueous ink composition at 20° C. and the particle size of the pigment before storage with the viscosity of the aqueous ink composition at 20° C. and the particle size of the pigment after storage.

The viscosity was measured with an oscillation viscometer VM-100AL (manufactured by Yamaichi Electronics Co., Ltd.) after the aqueous ink composition was maintained at 20° C. for one hour. The particle size of pigment was measured as the average particle size with a laser Doppler particle size distribution analyzer Microtrac UPA150 (manufactured by Nikkiso Co., Ltd.).

The evaluation criteria were described below.
Viscosity Change
  Good: The viscosity change was −0.3 mPa·s or more and +0.3 mPa·s or less.
  Poor: The viscosity change was less than −0.3 mPa·s or more than +0.3 mPa·s.
Particle Size Change
  Good: The rate of change in average particle size was less than 5%.
  Poor: The rate of change in average particle size was 5% or more.
3.3.2. Evaluation of Bleeding or Blurring
(1) Preparation of Recorded Matter
A temperature adjustable heater that could heat a recording medium during recording of images was installed on a paper guide of an ink jet printer PX-G930 (manufactured by Seiko Epson Co.).

The nozzles of the modified printer were filled with aqueous ink compositions of four colors (C, M, Y, and K). A solid pattern image was formed on a plastic medium (trade name "Cold laminate film PG-50L", manufactured by Lami Corporation Inc., PET film) at normal temperature and pressure such that each of C, M, and K was in contact with Y. The plastic medium was heated to 45° C. with the heater on the paper guide to dry the solid pattern image. The plastic medium was then placed in a dryer at 60° C. to dry the solid pattern image for another one minute. Thus, recorded matter containing the solid pattern image formed on the plastic medium was prepared.

The solid pattern image was formed in 720 dpi by 720 dpi resolution at 50% duty. The term "duty", as used herein, refers to the percentage (%) of ink-dotted partitions. In 720 dpi by 720 dpi resolution, the duty is the percentage of ink-dotted partitions in 720×720=518,400 partitions per square inch.

The yellow (Y) aqueous ink composition was prepared above in "3.2. Preparation of Aqueous Ink Composition".

For the C, M, and K aqueous ink compositions, the pigment dispersion was prepared as described above in "3.1. Preparation of Pigment Dispersion" except that the following pigments were used in place of C.I. pigment yellow 180. The C, M, and K aqueous ink compositions were prepared as described above in "3.2. Preparation of Aqueous Ink Composition" using these pigment dispersions.

Cyan (C) ink composition: C.I. pigment blue 15:3
Magenta (M) ink composition: C.I. pigment red 122
Black (K) ink composition: C.I. pigment black 7

(2) Method for Evaluating Recorded Matter

In the recorded matter prepared in (1), bleeding or blurring in contact portions between Y and other colors (C, M, and K) at different duties was observed.

The evaluation criteria were described below.

Good: No bleeding or blurring was observed in the contact portions.

Poor: Bleeding or blurring was observed in the contact portions.

3.3.3. Evaluation of Ejection Stability (1) Preparation of Recorded Matter

The nozzles of the ink jet printer PX-G930 used in "3.3.2. Evaluation of Bleeding or Blurring" were filled with the aqueous ink composition prepared above in "3.2. Preparation of Aqueous Ink Composition". The aqueous ink compositions were continuously ejected onto plain paper (Fuji Xerox P paper etc.) for 10 minutes without heating the plain paper to check that the aqueous ink compositions were properly ejected from all the nozzles. A mixed pattern image of text and a figure was then continuously printed on plain paper heated to 45° C. at an average duty of 10% for a predetermined time to prepare recorded matter. The weight of ink ejected per dot was 20 ng. The resolution was 720 dpi by 720 dpi.

(2) Method for Evaluating Recorded Matter

The "missing dots" and "deviation" of the resulting recorded matter were evaluated. The term "deviation", as used herein, refers to the displacement of the ink landing position on the recorded matter.

The evaluation criteria were described below.

Good: No missing dot and no deviation were observed one hour after the start of printing.

Fair: One hour after the start of printing, no missing dot was observed but deviation occurred.

Poor: One hour after the start of printing, missing dots and deviation occurred frequently.

3.3.4. Evaluation of Abrasion Resistance (1) Preparation of Recorded Matter

The nozzles of the ink jet printer PX-G930 used in "3.3.2. Evaluation of Bleeding or Blurring" were filled with the aqueous ink composition (yellow ink) prepared in "3.2. Preparation of Aqueous Ink Composition". A solid pattern image was formed on a plastic medium (trade name "Cold laminate film PG-50L", manufactured by Lami Corporation Inc., PET film) heated to 45° C. The plastic medium was then left still in a dryer at 60° C. to dry the solid pattern image for another one minute. Thus, recorded matter containing the solid pattern image formed on the plastic medium was prepared. The solid pattern image was formed in 720 dpi by 720 dpi resolution at 60% duty.

(2) Method for Evaluating Recorded Matter

After the resulting recorded matter was held at 20° C. for 16 hours, the recorded matter was rubbed 50 times under a load of 500 g against a white cotton cloth attached to a friction block on a Gakushin-type rubbing fastness tester AB-301 (manufactured by Tester Sangyo Co., Ltd.). The surface state of an image was visually inspected.

The evaluation criteria were described below.

Good: No scratch was observed on the surface of the image.

Fair: Slight scratches were observed on the surface of the image.

Poor: A large scratch was observed on the surface of the image.

3.3.5. Evaluation of Light Resistance (1) Preparation of Recorded Matter

The nozzles of an ink jet printer PX-5500 (manufactured by Seiko Epson Co.) were filled with the aqueous ink composition (yellow ink) prepared in "3.2. Preparation of Aqueous Ink Composition". Recorded matter was prepared by printing a 10 mm×10 mm solid image on a photo paper (manufactured by Seiko Epson Co., model number "KA420PSKR", glossy paper) at normal temperature and pressure at an optical density (OD) of 1.0.

(2) Method for Evaluating Recorded Matter

After exposure at an illuminance of 70,000 Lux for 600 hours in a xenon arc weatherometer XL75 (manufactured by Suga Test Instruments Co., Ltd.), the OD of the solid image of the recorded matter was measured with GRETAG SPM-50 (manufactured by GretagMacbeth). The light resistance of the image was evaluated by the ratio of the OD after exposure to the OD before exposure.

The evaluation criteria were described below.

Good: The decrease in OD was less than 20%.

Poor: The decrease in OD was 20% or more.

3.4. Evaluation Results

Tables 1 and 2 show the evaluation test results.

TABLE 1

| | | Example 1 | Example 2 | Example 3 | Example 4 | Example 5 | Example 6 | Example 7 | Example 8 |
|---|---|---|---|---|---|---|---|---|---|
| Pigment (mass %) | P.Y. 180 | 4.0 | 4.0 | 3.5 | 4.0 | 4.0 | 4.0 | 4.0 | 4.0 |
| | P.Y. 74 | | | | | | | | |
| 1st solvent (mass %) | 1,2-hexanediol | 3.0 | 3.0 | | 3.0 | 3.0 | 6.0 | 6.0 | 6.0 |
| | 1,2-pentanediol | | | 3.0 | | | | | |
| 2nd solvent (mass %) | 1,3-dimethyl-2-imidazolidinone | 3.0 | | 3.0 | 3.0 | | 3.0 | | |
| | N,N'-dimethylpropyleneurea | | 4.0 | | | | | | |
| | 2-pyrrolidone | 4.5 | | | 4.5 | 3.0 | 3.0 | 5.0 | 3.0 |
| | N-methyl-2-pyrrolidone | | 5.0 | 4.0 | | | | 5.0 | 3.0 |
| 3rd solvent (mass %) | Propylene glycol | 5.0 | 5.0 | 7.0 | | 6.0 | 12.0 | 15.0 | 19.0 |
| | 1,3-propanediol | | | | 5.0 | | | | |
| Other solvents (mass %) | Glycerin | | | | | | | | |
| | Diethylene glycol monobutyl ether | | | | | | | | |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Silicon surfactant (mass %) | Polyether-modified siloxane | 0.5 | 0.5 | 0.5 | 0.5 | 0.5 | 0.5 | 0.5 | 0.5 |
| Resin dispersant (mass %) | Acrylic acid-acrylate copolymer | 1.0 | 1.0 | 0.9 | 1.0 | 1.0 | 1.0 | 1.0 | 1.0 |
| Resin particle (mass %) | Styrene-acrylic acid copolymer | 2.0 | 2.0 | 2.0 | 2.0 | 2.0 | 2.0 | 2.0 | 2.0 |
| Remainder (mass %) | Ion-exchanged water | 77.0 | 75.5 | 76.1 | 77.0 | 80.5 | 68.5 | 61.5 | 61.5 |
|  | 2nd solvent/1st solvent (content ratio) | 2.50 | 3.00 | 2.33 | 2.50 | 1.00 | 1.00 | 1.67 | 1.00 |
|  | (2nd solvent + 3rd solvent)/1st solvent (content ratio) | 4.17 | 4.67 | 4.67 | 4.17 | 3.00 | 3.00 | 4.17 | 4.17 |
| Evaluation results | Storage stability | Viscosity change | Good | Good | Good | Good | Good | Good | Good | Good |
|  |  | Particle size change | Good | Good | Good | Good | Good | Good | Good | Good |
|  | Bleeding or blurring | Bleeding or blurring | Good | Good | Good | Good | Good | Good | Good | Good |
|  | Ejection stability | Missing dots, deviation | Good | Good | Good | Good | Good | Good | Good | Good |
|  | Abrasion resistance | Scratches | Good | Good | Poor | Good | Good | Good | Good | Good |
|  | Light resistance | Evaluation results | Good | Good | Good | Good | Good | Good | Good | Good |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Pigment (mass %) | P.Y. 180 |  | 4.0 | 4.0 | 4.0 | 4.0 | 4.0 |
|  | P.Y. 74 | 4.0 |  |  |  |  |  |
| 1st solvent (mass %) | 1,2-hexanediol | 3.0 | 3.0 | 6.0 | 7.0 | 2.0 | 3.0 |
|  | 1,2-pentanediol |  |  |  |  |  |  |
| 2nd solvent (mass %) | 1,3-dimethyl-2-imidazolidinone | 3.0 |  | 2.0 |  |  | 3.0 |
|  | N,N'-dimethylpropyleneurea |  |  |  |  |  |  |
|  | 2-pyrrolidone | 4.5 | 2.0 | 2.0 | 5.0 | 2.0 | 4.5 |
|  | N-methyl-2-pyrrolidone |  |  |  |  |  |  |
| 3rd solvent (mass %) | Propylene glycol | 5.0 | 7.0 | 14.0 | 4.0 | 7.0 |  |
|  | 1,3-propanediol |  |  |  |  |  |  |
| Other solvents (mass %) | Glycerin |  |  |  |  |  | 5.0 |
|  | Diethylene glycol monobutyl ether |  |  |  |  |  |  |
| Silicon surfactant (mass %) | Polyether-modified siloxane | 0.5 | 0.5 | 0.5 | 0.5 | 0.5 | 0.5 |
| Resin dispersant (mass %) | Acrylic acid-acrylate copolymer | 1.0 | 1.0 | 1.0 | 1.0 | 1.0 | 1.0 |
| Resin particle (mass %) | Styrene-acrylic acid copolymer | 2.0 | 2.0 | 2.0 | 2.0 | 2.0 | 2.0 |
| Remainder (mass %) | Ion-exchanged water | 77.0 | 80.5 | 68.5 | 76.5 | 81.5 | 77.0 |
|  | 2nd solvent/1st solvent (content ratio) | 2.50 | 0.67 | 0.67 | 0.71 | 1.00 | 2.50 |
|  | (2nd solvent + 3rd solvent)/1st solvent (content ratio) | 4.17 | 3.00 | 3.00 | 1.29 | 4.50 | — |
| Evaluation results | Storage stability | Viscosity change | Good | Poor | Poor | Poor | Good | Good |
|  |  | Particle size change | Good | Poor | Poor | Poor | Good | Good |
|  | Bleeding or blurring | Bleeding or blurring | Good | Good | Good | Good | Poor | Poor |
|  | Ejection stability | Missing dots, deviation | Good | Good | Good | Poor | Fair | Good |
|  | Abrasion resistance | Scratches | Good | Good | Poor | Good | Good | Poor |
|  | Light resistance | Evaluation results | Poor | Good | Good | Good | Good | Good |

TABLE 2-continued

|  |  | Comparative Example 7 | Comparative Example 8 | Comparative Example 9 |
|---|---|---|---|---|
| Pigment (mass %) | P.Y. 180 | 4.0 | 4.0 | 4.0 |
|  | P.Y. 74 |  |  |  |
| 1st solvent (mass %) | 1,2-hexanediol | 3.0 | 6.5 | 3.0 |
|  | 1,2-pentanediol |  |  |  |
| 2nd solvent (mass %) | 1,3-dimethyl-2-imidazolidinone | 3.0 |  |  |
|  | N,N'-dimethylpropyleneurea |  |  |  |
|  | 2-pyrrolidone | 4.5 | 7.0 | 3.0 |
|  | N-methyl-2-pyrrolidone |  |  |  |
| 3rd solvent (mass %) | Propylene glycol |  | 13.0 | 5.0 |
|  | 1,3-propanediol |  |  |  |
| Other solvents (mass %) | Glycerin |  |  |  |
|  | Diethylene glycol monobutyl ether | 5.0 |  |  |
| Silicon surfactant (mass %) | Polyether-modified siloxane | 0.5 | 0.5 | 0.5 |
| Resin dispersant (mass %) | Acrylic acid-acrylate copolymer | 1.0 | 1.0 | 1.0 |
| Resin particle (mass %) | Styrene-acrylic acid copolymer | 2.0 | 2.0 | 2.0 |
| Remainder (mass %) | Ion-exchanged water | 77.0 | 66.0 | 81.5 |
|  | 2nd solvent/1st solvent (content ratio) | 2.50 | 1.08 | 1.00 |
|  | (2nd solvent + 3rd solvent)/1st solvent (content ratio) | — | 3.08 | 2.67 |
| Evaluation results | Storage stability | Viscosity change | Poor | Poor | Poor |
|  |  | Particle size change | Poor | Poor | Poor |
|  | Bleeding or blurring | Bleeding or blurring | Good | Good | Good |
|  | Ejection stability | Missing dots, deviation | Fair | Good | Good |
|  | Abrasion resistance | Scratches | Good | Good | Good |
|  | Light resistance | Evaluation results | Good | Good | Good |

The evaluation results of storage stability show that the aqueous ink compositions according to Examples 1 to 8 shown in Table 1 have high storage stability with small changes in viscosity and particle size. The evaluation results of bleeding or blurring show that the aqueous ink compositions according to Examples 1 to 8 produced the image on the plastic medium with less blurring. The evaluation results of light resistance show that the aqueous ink compositions according to Examples 1 to 8 have high light resistance with a small decrease in the OD of the image. The evaluation results of ejection stability show that the aqueous ink compositions according to Examples 1 to 8 have high ejection stability in the continuous printing with less missing dots of the image and displacement of the ink landing position.

The evaluation results of abrasion resistance show that the aqueous ink compositions according to Examples 1 and 2 and Examples 4 to 8 have high abrasion resistance with no scratch on the surface of the image. Although the aqueous ink composition according to Example 3 shown in Table 1 had slight scratches on the surface of the image in the abrasion resistance test, the scratches were not significant for practical applications.

The aqueous ink composition according to Comparative Example 1 shown in Table 2 did not contain C.I. pigment yellow 180. For this reason, the image recorded had low light resistance.

The aqueous ink compositions according to Comparative Examples 2 and 3 shown in Table 2 had a ratio (W2/W1) of the second solvent content (W2) to the first solvent content (W1) below one. For this reason, the aqueous ink compositions had low storage stability.

The aqueous ink composition according to Comparative Example 4 shown in Table 2 had a first solvent content (W1) above 6% by mass. The aqueous ink composition according to Comparative Example 4 had a ratio (W2/W1) of the second solvent content (W2) to the first solvent content (W1) below one and a ratio [(W2+W3)/(W1)] of the total (W2+W3) of the second solvent content (W2) and the third solvent content (W3) to the first solvent content (W1) below three. For this reason, the aqueous ink composition according to Comparative Example 4 had low storage stability and ejection stability.

The aqueous ink composition according to Comparative Example 5 shown in Table 2 had a first solvent content below 3% by mass. For this reason, the image recorded had blurring.

The aqueous ink composition according to Comparative Example 6 shown in Table 2 contained glycerin. For this reason, the aqueous ink composition according to Comparative Example 6 produced a blurred image having low abrasion resistance in the bleeding or blurring test and the abrasion resistance test.

The aqueous ink composition according to Comparative Example 7 shown in Table 2 contained one of glycol ethers, diethylene glycol monobutyl ether. For this reason, the aqueous ink composition according to Comparative Example 7 had low storage stability.

The aqueous ink composition according to Comparative Example 8 shown in Table 2 had a first solvent content above 6% by mass. For this reason, the aqueous ink composition according to Comparative Example 8 had low storage stability.

The aqueous ink composition according to Comparative Example 9 shown in Table 2 had a ratio (W2/W1) of the second solvent content (W2) to the first solvent content (W1) of one or more and a ratio [(W2+W3)/(W1)] of the total (W2+W3) of the second solvent content (W2) and the third solvent content (W3) to the first solvent content (W1) below three. For this reason, the aqueous ink composition according to Comparative Example 9 had low storage stability.

The invention is not limited to the embodiments described above, and various modifications may be made therein. For example, the invention includes substantially the same constitutions as those described in the embodiments (for example, constitutions having the same functions, methods, and results, and constitutions having the same objects and advantages). The invention also includes constitutions in which unessential portions of the constitutions described in the embodiments are substituted. The invention also includes other constitutions that have the operation and effect of the constitutions described in the embodiments and other constitutions with which the same objects can be achieved. The invention also includes constitutions in which the constitutions described in the embodiments are combined with known techniques.

What is claimed is:

1. An ink jet recording method comprising:
    ejecting droplets of an aqueous ink composition from an ink jet recording apparatus onto a non-ink-absorbing or low-ink-absorbing recording medium; and
    heating the recording medium to 40° C. or more to dry the aqueous ink composition deposited on the recording medium,
    wherein the aqueous ink composition contains a pigment containing C.I. pigment yellow 180,
    a first solvent containing at least one selected from 1,2-hexanediol and 1,2-pentanediol,
    a second solvent containing at least one selected from the group consisting of 2-pyrrolidone, N-methyl-2-pyrrolidone, N,N'-dimethylpropyleneurea, 1,3-dimethyl-2-imidazolidinone, tetramethylurea, dimethyl sulfoxide, and hexamethylphosphoric triamide, and
    a third solvent containing at least one selected from propylene glycol and 1,3-propanediol,
    the first solvent content (W1) is 3% by mass or more and 6% by mass or less of the mass of the aqueous ink composition,
    the ratio (W2/W1) of the second solvent content (W2) to the first solvent content (W1) is one or more, and
    the ratio [(W2+W3)/(W1)] of the total (W2+W3) of the second solvent content (W2) and the third solvent content (W3) to the first solvent content (W1) is three or more.

2. Recorded matter prepared by the ink jet recording method according to claim 1.

3. The ink jet recording method according to claim 1, wherein the total (W2+W3) of the second solvent content (W2) and the third solvent content (W3) is 9% by mass or more and 25% by mass or less of the aqueous ink composition.

4. Recorded matter prepared by the ink jet recording method according to claim 3.

5. The ink jet recording method according to claim 1, wherein the pigment content is 1% by mass or more and 10% by mass or less of the aqueous ink composition.

6. Recorded matter prepared by the ink jet recording method according to claim 5.

7. The ink jet recording method according to claim 1, wherein the aqueous ink composition has a viscosity of 2 mPa·s or more and 10 mPa·s or less at a measurement temperature of 20° C.

8. Recorded matter prepared by the ink jet recording method according to claim 7.

* * * * *